United States Patent [19]

Scheinpflug et al.

[11] 3,723,628
[45] Mar. 27, 1973

[54] (N-TRIHALOMETHYLTHIO-N-TRIFLUOROMETHYL-AMINO)-BENZAMIDES AS FUNGICIDAL AGENTS

[75] Inventors: Hans Scheinpflug, Leverkusen; Engelbert Kuhle, Berg. Gladbach; Erich Klauke, Cologne-Flittard; Paul-Ernst Frohberger, Leverkusen; Ferdinand Grewe, Burscheid, all of Germany

[73] Assignee: Farbenfabriken Bayer Aktiengesellschaft, Leverkusen, Germany

[22] Filed: Feb. 18, 1971

[21] Appl. No.: 116,591

Related U.S. Application Data

[60] Division of Ser. No. 10,299, Feb. 10, 1970, Pat. No. 3,597,480, which is a continuation-in-part of Ser. No. 666,918, Sept. 11, 1967, abandoned.

[30] Foreign Application Priority Data

Sept. 15, 1966 Germany..............................F 50206

[52] U.S. Cl................................................424/324
[51] Int. Cl.................................................A01n 9/20
[58] Field of Search.....................424/324; 260/558

[56] References Cited

UNITED STATES PATENTS 3,597,480    8/1971    Scheinpflug et al..................260/558

OTHER PUBLICATIONS

Dessey: Morhology & Taxonomy of Fungi (1950), p. 298 (Blakiston Co., Phila.)

*Primary Examiner*—Albert T. Meyers
*Assistant Examiner*—Leonard Schenkman
*Attorney*—Burgess, Dinklage & Sprung

[57] ABSTRACT (N-trihalomethylthio-N-trifluoromethyl-amino)-benzamides which possess fungicidal properties and which may be produced by reacting the corresponding fluorocarbonyl-N-trihalomethylthio-N-trifluoromethyl-anilines, in the presence of an acid-binding agent, with amines.

17 Claims, No Drawings

(N-TRIHALOMETHYLTHIO-N-TRIFLUOROMETHYL-AMINO)-BENZAMIDES AS FUNGICIDAL AGENTS

This is a division of co-pending U.S. application Ser. No. 10,299, filed Feb. 10, 1970, now Patent No. 3,597,480, which is a continuation-in-part of co-pending U.S. application Ser. No. 666,918, filed Sept. 11, 1967, now abandoned.

The present invention relates to and has for its objects the provision for particular new (N-trihalomethylthio-N-trifluoromethyl-amino)-benzamides which possess fungicidal properties, active compositions in the form of mixtures of such compounds with solid and liquid dispersible carrier vehicles, and methods for producing such compounds and for using such compounds in a new way especially for combatting fungi, e.g. in plant protection endeavors, with other and further objects becoming apparent from a study of the within specification and accompanying examples.

It is known that N-trichloromethylmercapto-cyclohex-4-ene-1,2-dicarboximide (A) can be used as a fungicide in plant protection. This compound is used as an organic-synthetic fungicidally active compound for the control of fungoid diseases in cereals such as rice, since organo-mercury compounds are generally avoided because of their high toxicity to warm-blooded animals.

It has been found in accordance with the present invention that the particular new (N-trihalomethylthio-N-trifluoromethyl-amino)-benzamides having the formula

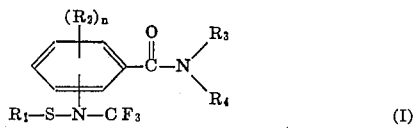

(I)

in which $n$ is a whole number from 0 to 3, $R_1$ is trihalomethyl, $R_2$ is selected from the group consisting of halo, lower alkyl, lower alkoxy, trifluoromethyl, and mixtures thereof when $n$ is 2–3, $R_3$ is selected from the group consisting of hydrogen, lower alkyl and lower alkenyl, and $R_4$ is selected from the group consisting of hydrogen, alkyl, alkenyl, cycloalkyl, phenyl, substituted phenyl which is substituted with 1–3 substituents selected from the group consisting of halo, nitro, lower alkyl, lower alkoxy and mixtures of such substituents, and hydroxylower alkyl, exhibit strong fungicidal properties, especially against phytopathogenic fungi.

It has been furthermore found in accordance with the present invention that a versatile and smooth process for the production of the particular new (N-trihalomethylthio-N-trifluoromethyl-amino)-benzamides of formula (I) above in favorable yields may be provided, which comprises reacting fluorocarbonyl-N-trihalomethylthio-N-trifluoromethyl-anilines having the formula

(IIa)

in which $R_1$, $R_2$, and $n$ are the same as defined above, with amines having the formula

(IIb)

in which $R_3$ and $R_4$ are the same as defined above, in the presence of an acid-binding agent.

The fluorocarbonyl-N-trihalomethylthio-N-trifluoromethyl-anilines used as starting compounds herein may be prepared by reaction of the corresponding fluorocarbonyl-N-trifluoromethyl-arylamines with sulfonic acid chlorides in the presence of a tertiary base as acid acceptor (cf. for example Ser. No. 624,981).

The reaction temperatures usable for the reaction of compounds of formula (IIa) with compounds of formula (IIb) can be varied within a fairly wide range; preferably the work is carried out at substantially between about 10 to 50°C. As solvents or diluents, there are suitable, besides water, inert organic solvents such as benzene, chlorobenzene, dioxan, acetone, and the like.

In order to bind the hydrogen fluoride liberated during the reaction, a tertiary base or alkali metal hydroxide, or the like, is added. Expediently, however, there is used double the amount of the amine required for the reaction, so that the excess amine acts as acid-binding agent.

Suitable active compounds according to the present invention include 2-,3- or 4-(N-dichlorofluoromethylthio-N-trifluoromethyl-amino)-benzoic acid- -amide, -methylamide, -allylamide, -butylamide, -dodecylamide, -dimethylamide, -methylbutylamide, -diisobutylamide, -cyclohexylamide, -anilide, -p-chloroanilide, -2′,4′-dichloroanilide, -m-nitroanilide, -o-toluidide, -p-anisidide; 2-(N-trichloromethylthio-N-trifluoromethylamino)-benzoic acid butylamide; 3-N-bromochlorofluoromethylthio-N-trifluoromethyl-amino)-benzoic acid dimethylamide, and the like.

Advantageously, the particular new active compounds of the present invention exhibit a strong fungitoxic activity against phytopathogenic fungi. Their good compatibility with respect to warm-blooded animals and higher plants allows the use of the instant compounds as plant protection agents against fungoid diseases. It should be noted that the instant compounds do not normally damage cultivated plants in the concentrations necessary for the control of fungi. The instant compounds are particularly usable as fungitoxic agents in plant protection such as for the control of various fungi, for example of different classes of fungi, including Archimycetes, Phycomycetes, Ascomycetes, Basidiomycetes, Fungi Imperfecti, and the like.

The particular new active compounds of the present invention have a very wide spectrum of activity. Such compounds can be used therefore against parasitic fungi on above-the-ground portions of plants, fungi causing tracheomycosis, which attack the plant from the soil, seed-borne fungi and fungi which inhabit the soil.

Specifically, such active compounds according to the present invention have for example proved effective against *Phytophthora infestans*, *Plasmopara viticola*, *Venturia inaequalis*, *Podosphaera leucotricha*, *Cochliobolus myiabeanus*, *Mycosphaerella musicola*, *Cercospora personata*, *Botrytis ciperea*, *Alternaria* species, *Piricularia oryzae*, and the like.

The instant active compounds have exhibited particularly good results in the control of rice diseases. Thus such compounds show an excellent activity against the fungi *Piricularia oryzae* and *Pellicularia sasakii*, so that they can be used for the joint control of these two fungoid diseases. This represents a substantial technical advance in the art, since hitherto agents from different chemical groups had to be used against these two fungi. Surprisingly, the instant active compounds show not only a protective action, but also a curative effect, for example against *Venturia inaequalis*.

Likewise highly effective and of particular practical importance are the instant active compounds when used as seed dressing agents or soil treatment agents against phytopathogenic fungi which adhere to the seed or occur in the soil and cause, in cultivated plants, seedling diseases, root rot tracheomycoses, and diseases of the stalk, blade, leaf, blossom, fruit or seed, such as *Tilletia caries, Helminthosporium gramineum, Fusarium nivale, Fusarium culmorum, Rhizoctonia solani, Phialophora cinerescens, Verticillium alboatrum, Fusarium dianthi, Fusarium cubense, Fusarium oxysporum, Fusarium solani, Sclerotinia sclerotiorum, Thielaviopsis basicola, Phytophthora cactorum*, and the like.

The particular active compounds according to the instant invention can be utilized, if desired, in the form of the usual formulations or compositions with diluents or extenders, i.e., dispersible carrier vehicles, such as solutions, emulsions, suspensions, emulsifiable concentrates, spray powders, pastes, soluble powders, dusting agents, granulates, etc. These are prepared in known manner, for instance by extending the active compounds with dispersible liquid diluent carriers and/or dispersible solid carriers optionally with the use of carrier vehicle assistants, e.g., surface-active agents, including emulsifying agents and/or dispersing agents, whereby, for example, in the case where water is used as diluent, organic solvents may be added as auxiliary solvents (cf. Agricultural Chemicals, March 1960, pages 35-38). The following may be chiefly considered for use as carrier vehicles for this purpose: dispersible liquid diluent carriers, such as aromatic hydrocarbons (for instance, benzene, toluene, xylene, etc.), halogenated, especially chlorinated, aromatic hydrocarbons (for instance, chlorobenzenes), paraffins (for instance, petroleum fractions), chlorinated aliphatic hydrocarbons (for instance, methylene chloride, etc.), alcohols (for instance, methanol, ethanol, propanol, butanol, etc.), amines (for instance, ethanolamine, etc.), ethers, ether-alcohols (for instance, glycol monomethyl ether, etc.), amides (for instance, dimethyl formamide, etc.), sulfoxides (for instance, dimethyl sulfoxide, etc.), ketones (for instance, acetone, etc.), and water; as well as dispersible finely divided solid carriers, such as ground natural minerals (for instance, kaolins, alumina, silica, chalk, i.e., calcium carbonate, talc, kieselguhr, etc.) and ground synthetic minerals (for instance, highly dispersed silicic acid, silicates, e.g., alkali silicates, etc.); whereas the following may be chiefly considered for use as carrier vehicle assistants, e.g., surface-active agents, for this purpose: emulsifying agents, such as non-ionic and anionic emulsifying agents (for instance, polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and dispersing agents, such as lignin, sulfite waste liquors, methyl cellulose, etc.

As will be appreciated by the artisan, the active compounds according to the instant invention may be employed alone or in the form of mixtures with one another and/or with such solid or liquid dispersible carrier vehicles and/or with other known compatible active agents, especially plant protection agents, such as other fungicides, herbicides, insecticides, bactericides, nematocides, protective substances which protect against damage by birds, growth promoters, plant nutrients, soil structure improving agents, etc., if desired, or in the form of particular dosage preparations for specific application made therefrom, such as solutions, emulsions, suspensions, powders, pastes, and granulates which are thus ready for use.

As concerns commercially marketed preparations, these generally contemplate carrier composition mixtures in which the active compound is present in an amount substantially between about 0.1-95 percent, and preferably 0.5-90 percent, by weight of the mixture, whereas carrier composition mixtures suitable for direct application or field application generally contemplate those in which the active compound is present in an amount substantially between about 0.0005-0.5 percent, preferably 0.001-0.2 percent, by weight of the mixture, especially when used as leaf fungicides. Thus, the present invention contemplates over-all compositions which comprise mixtures of a dispersible carrier vehicle such as (1) a dispersible carrier solid, or (2) a dispersible carrier liquid preferably including a carrier vehicle assistant, e.g., surface-active agent such as an emulsifying agent and/or a dispersing agent, and an amount of the active compound which is effective for the purpose in question and which is generally about 0.0005-95 percent, and preferably 0.001-95 percent, by weight of the mixture.

In the case of seed treatment, i.e., seed dressing, in general, there are used amounts of the particular active compound between about 0.1-10g, preferably 0.5-5g, per kg of seed. For the treatment of soil, amounts of the given active compound of between about 1-500g, preferably 10-200g, per cubic meter of soil are generally necessary.

Furthermore, the present invention contemplates methods of selectively controlling or combatting fungi, which comprises applying to at least one of (a) such fungi and (b) their habitat, a fungicidally effective amount of the particular active compound of the invention alone or together with a carrier vehicle as noted above. The instant formulations or compositions are applied in the usual manner, for instance by spraying, atomizing, vaporizing, scattering, dusting, watering, sprinkling, pouring, squirting, dressing, encrustation, and the like.

It will be realized, of course, that the concentration of the particular active compound utilized in admixture with the carrier vehicle will depend upon the intended application. Therefore, in special cases, it is possible to go above or below the aforementioned concentration ranges.

The following examples are set forth by way of illustration and not limitation of the manner of using the particular active compounds of the present invention.

EXAMPLE 1

| Piricularia test: | liquid p preparation of active compound |
|---|---|
| *Pellicularia* test: | liquid p reparation of active compound |
| Solvent: | 1 part by weight acetone |
| Dispersing agent: | 0.05 parts by weight sodium oleate |
| Other additives: | 0.2 parts by weight gelatin |
| Water: | 98.75 parts by weight $H_2O$ |

The amount of the particular active compound required for the desired concentration of such active compound in the spray liquor is mixed with the stated amount of solvent, and the resulting concentrate is diluted with the stated amount of water containing the stated amounts of dispersing agent and gelatin.

Two batches of 30 rice plants about 2-4 weeks old are sprayed with the spray liquor until dripping wet. The plants remain in a greenhouse at temperatures of 22-24°C and a relative atmospheric humidity of about 70 percent until they are dry. One batch of the plants is then inoculated with an aqueous suspension of 100,000 to 200,000 spores/ml of *Piricularia oryzae* and placed in a chamber at 24-26°C and 100 percent relative atmospheric humidity. The other batch of plants is infected with a culture of *Pellicularia sasakii* grown on, malt agar and kept at 28-30°C and 100 percent relative atmospheric humidity.

5-8 days after inoculation, the infestation of all the leaves present at the time of inoculation with *Piricularia* is determined as a percentage of the untreated but also inoculated control plants. In the case of the plants infected with *Pellicularia sasakii* the infestation is, after the same time, determined on the leaf sheaths, likewise in proportion to the untreated but infected control plants. 0 percent means no infestation; 100% means that the infestation is exactly as great in the case of the control plants.

The particular active compounds, the concentrations of such active compounds and the results obtained can be seen from the following Table 1:

TABLE 1

Piricularia test / Pellicularia test } Liquid preparation of active compound

| Active compound | Infestation as a percentage of the infestation of the untreated control with a concentration of active compound (in percent) of— | |
|---|---|---|
| | *Piricularia oryzae*, 0.05 | *Pellicularia sasakii*, 0.05 |
| (A) [structure with NSCCl₃] (known) | 16 | 100 |
| (III₁) phenyl–CO–NH–C₄H₉–n ; –N(CF₃)–S–CFCl₂ | 0 | |
| (IV₁) phenyl–CONH₂ ; –N(CF₃)–S–CFCl₂ | 0 | |
| (V₁) phenyl–CON(CH₃)₂ ; –N(CF₃)–S–CFCl₂ | 0 | |
| (VI₁) phenyl–CONHCH₃ ; –N(CF₃)–SCFCl₂ | 0 | |
| (VII₁) phenyl–CONHC₂H₅ ; –N(CF₃)–SCFCl₂ | 12 | |
| (VIII₁) Cl₂FCS–N(CF₃)–phenyl–CON(CH₃)₂ | 0 | |
| (IX₁) Cl₂FCS–N(CF₃)–phenyl–CONHC₄H₉-n | 0 | 3 |
| (X₁) Cl₂FCS–N(CF₃)–phenyl(CONHC₂H₅) | 0 | 44 |

TABLE 1—Continued

| Active compound | Piricularia oryzae, 0.05 | Pellicularia sasakii, 0.05 |
|---|---|---|
| (XI₁) Cl₂FCS—N(CF₃)—C₆H₄—CON(CH₃)₂ | 0 | |
| (XII₁) Cl₂FCS—N(CF₃)—C₆H₄—CONHCH₃ | 1 | 54 |
| (XIII₁) CF₃—C₆H₃(—N(CF₃)—SCFCl₂)—CONHC₄H₉-n | 0 | |
| (XIV₁) CF₃—C₆H₃(—N(CF₃)—SCFCl₂)—CON(CH₃)₂ | 0 | |
| (XV₁) CF₃—C₆H₃(—N(CF₃)—SCFCl₂)—CONHC₂H₅ | 0 | |
| (XVI₁) (CH₃)₂NCO—C₆H₃(CH₃)—N(CF₃)—SCFCl₂ | 0 | 25 |
| (XVII₁) CH₃NHCO—C₆H₃(CH₃)—N(CF₃)—SCFCl₂ | 0 | |
| (XVIII₁) CH₃—C₆H₃(—N(CF₃)—SCFCl₂)—CON(CH₃)₂ | | 4 |
| (XIX₁) OCH₃—C₆H₃(—N(CF₃)—SCFCl₂)—CONHCH₃ | | 38 |
| (XX₁) C₆H₄(—N(CF₃)—SCFCl₂)—CON(CH₃)—CH₂—CH₂OH | 0 | |
| (XXI₁) C₆H₄(—N(CF₃)—SCFCl₂)—CONHC₄H₉-tert. | 0 | |
| (XXII₁) Cl—C₆H₃(—N(CF₃)—SCFCl₂)—CONHCH₃ | 0 | 0 |
| (XXIII₁) C₆H₄(—N(CF₃)—SCFCl₂)—CONH—C₆H₁₁ | 0 | |

Example 2

Mycelium growth test
 Nutrient medium used:
 20 parts by weight agar-agar (powdered)
 30 parts by weight malt extract
 950 parts by weight distilled $H_2O$
 Proportion of solvent to nutrient medium:
 2 parts by weight acetone
 100 parts by weight agar nutrient medium The amount of the particular active compound required for the desired concentration of such active compound in the nutrient medium is mixed with the stated amount of solvent. The resulting solvent preparation concentrate is thoroughly mixed, in the stated proportion, with the liquid nutrient medium (which has been cooled to 43°C), and is then poured into Petri dishes of 9 cm diameter. Control dishes of the nutrient medium to which the solvent preparation has not been added are also set up.

When the nutrient medium has cooled and solidified, the dishes are inoculated with the species of fungi stated in Table 2 and Table 2a and incubated at about 21°C.

Evaluation is carried out after 4-10 days, depending upon the speed of growth of the fungi. When evaluation is carried out, the radial growth of the mycelium of the treated nutrient media is compared with the growth on the control nutrient media. In the evaluation, there is determined the lowest concentration at which the individual fungi are totally inhibited.

The particular active compounds and the lowest effective concentration in ppm are stated in the following Table 2 and Table 2a:

TABLE 2
Mycelium growth test

| Active compound | Botrytis cinerea | Cochliobolus miyabeanus | Fusarium cubense | Fusarium dianthi | Alternaria tenuis | Pellicularia sasakii | Verticillium albo-atrum | Cercospora coffeicola | Phialophora cinerescens | Cercospora personata | Cercospora musae | Piricularia oryzae |
|---|---|---|---|---|---|---|---|---|---|---|---|---|
| (A) — ⌬CO-N-SCCl₃-CO (known) | 100 | 100 | 100 | 100 | 500 | 50 | 100 | 100 | 100 | 50 | 50 | 50 |
| (IV₂) — ⌬-CONH₂, N-SCFCl₂, CF₃ | 50 | 50 | 100 | 100 | 100 | 50 | 50 | 50 | 50 | 50 | 50 | 10 |
| (V₂) — ⌬-CON(CH₃)₂, N-SCFCl₂, CF₃ | 10 | 10 | 50 | 50 | 10 | 10 | 50 | 10 | 10 | 10 | 10 | 10 |
| (VI₂) — ⌬-CONHCH₃, N-SCFCl₂, CF₃ | 100 | 100 | 100 | 100 | 100 | 100 | 50 | 50 | 50 | 50 | 50 | 50 |

TABLE 2a
Mycelium growth test

| Active compound | Botrytis cinerea | Cochliobolus miyabeanus | Fusarium orysp.f. cubense | Fusarium orysp.f. dianthi | Pellicularia sasakii | Verticillium albo-atrum | Cercospora coffeicola | Phialophora cinerescens | Cercospora personata | Mycosphaerella musicola | Piricularia oryzae | Alternaria tenuis |
|---|---|---|---|---|---|---|---|---|---|---|---|---|
| (XXIV) — Cl-⌬-N-SCFCl₂, CF₃, CON(CH₃)₂ | 10 | 10 | 10 | 10 | 10 | 10 | 10 | 10 | 10 | 10 | 10 | 10 |
| (VII₂) — ⌬-CONHC₂H₅, N-SCFCl₂, CF₃ | 10 | 10 | 10 | 10 | 10 | 10 | 10 | 10 | 10 | 30 | 10 | 10 |

EXAMPLE 3

*Podosphaera* test (powdery mildew of apples) [Protective]

Solvent:     4.7 parts by weight acetone
Emulsifier:  0.3 parts by wt. alkylaryl polyglycol ether
Water:       95.0 parts by weight The amount of the particular active compound required for the desired concentration of such active compound in the spray liquid is mixed with the stated amount of solvent, and the resulting concentrate is diluted with the stated amount of water which contains the stated amount of emulsifier.

Young apple seedlings in the 4–6 leaf stage are sprayed with the spray liquid until dripping wet. The plants remain in a greenhouse for 24 hours at 20°C and at a relative atmospheric humidity of 70 percent. The plants are then inoculated by dusting with conidia of the apple powder mildew causative organism (*Podosphaera leucotricha* Salm) and placed in a greenhouse at a temperature of 21–23°C and at a relative atmospheric humidity of about 70 percent.

Ten days after the inoculation, the infestation of the seedlings is determined as a percentage of the untreated but also inoculated control plants.

Zero percent means no infestation; 100 percent means that the infestation is exactly as great as in the case of the control plants.

The particular active compounds, the concentrations of such active compounds and the results obtained can be seen from the following Table 3:

TABLE 3
Podosphaera test (Protective)

| Active compound | | Infestation[1] |
|---|---|---|
| (A) | 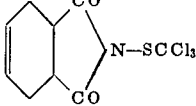 (known). | 100 |
| (VII$_3$) | 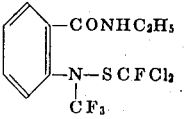 | 9 |
| (XXV$_1$) | 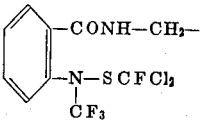 | 16 |

[1] As a percentage of the infestation of the untreated control with a concentration of active compound (in percent) of 0.025.

EXAMPLE 4

*Fusicladium* test (apple scab) [Curative]

Solvent:     4.7 parts by weight acetone
Emulsifier:  0.3 parts by wt. alkylaryl polyglycol ether
Water:       95.0 parts by weight The amount of the particular active compound required for the desired concentration of such active compound in the spray liquid is mixed with the stated amount of solvent, and the resulting concentrate is diluted with the stated amount of water which contains the stated amount of emulsifier.

Young apple seedlings in the 4–6 leaf stage are inoculated with an aqueous conidium suspension of the apple scab causative organism *Fusicladium dentriticum fuckel*, and incubated for 18 hours in a humidity chamber at 18–20°C and at an atmospheric humidity of 100 percent. The plants are then placed in a greenhouse where they dry.

After standing for a suitable period of time, the plants are sprayed dripping wet with the spray liquid prepared in the manner described above. The plants then are again placed in a greenhouse.

Fifteen days after inoculation, the infestation of the apple seedlings is determined as a percentage of the untreated but also inoculated control plants.

Zero percent means no infestation; 100 percent means that the infestation is exactly as great as in the case of the control plants.

The particular active compounds, the concentrations of such active compounds, the residence period between inoculation and spraying and the results obtained can be seen from the following Table 4:

TABLE 4
Fusicladium test [Curative]

| Active compound | | Residence period in hours | Infestation as a percentage of the infestation of the untreated control with a concentration of active compound (in percent) of— | |
|---|---|---|---|---|
| | | | 0.1 | 0.025 |
| (A) | 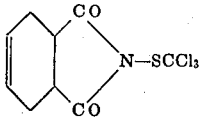 (known). | 42 | 100 | |
| (XXVI$_1$) | 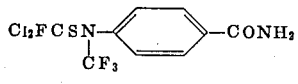 | 42 | 0 | 25 |
| (XII$_2$) | 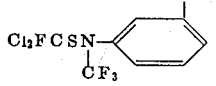 | 42 | 0 | 27 |

EXAMPLE 5

*Fusicladium* test (apple scab) [Protective]

Solvent: 4.7 parts by weight acetone
Emulsifier: 0.3 parts by wt. alkylaryl polyglycol ether
Water: 95.0 parts by weight The amount of the particular active compound required for the desired concentration of such active compound in the spray liquid is mixed with the stated amount of solvent, and the resulting concentrate is diluted with the stated amount of water which contains the stated amount of emulsifier.

Young apple seedlings in the 4–6 leaf stage are sprayed with the spray liquid until dripping wet. The plants remain in a greenhouse for 24 hours at 20°C and at a relative atmospheric humidity of 70 percent. The plants are then inoculated with an aqueous conidium suspension of the apple scab causative organism (*Fusicladium dentriticum fuckel*) and incubated for 18 hours in a humidity chamber at 18–20°C and at a relative atmospheric humidity of 100 percent.

The plants are then again placed in a greenhouse for 14 days.

Fifteen days after inoculation, the infestation of the seedlings is determined as a percentage of the untreated but also inoculated control plants.

Zero percent means no infestation; 100 percent means that the infestation is exactly as great as in the case of the control plants.

The particular active compounds, the concentrations of such active compounds and the results obtained can be seen from the following Table 5:

EXAMPLE 6

Seed dressing test [bunt of wheat] (seed-borne mycosis)

To produce a suitable dry dressing, the particular active compound is extended with a mixture of equal parts by weight of talc and kieselguhr to give a finely powdered mixture with the desired concentration of the active compound.

Wheat seed is contaminated with 5g of the chlamydospores of *Tilletia caries* per kg of seed. To apply the dressing, the seed is shaken with the dressing in a closed glass flask. The seed, on moist loam under a cover of a layer of muslin and 2 cm of moderately moist compost soil, is exposed to optimum germination conditions for the spores for 10 days at 10°C in a refrigerator.

The germination of the spores on the wheat grains, each of which is contaminated with about 100,000 spores, is subsequently determined microscopically. The smaller the number of spores which have germinated, the more effective is the given active compound.

The particular active compounds, the concentrations of such active compounds in the dressing, the amounts of dressing used and the percentage spore germination can be seen from the following Table 6:

TABLE 5
Fusicladium test (Protective)

| | | Infestation as a percentage of the infestation of the untreated control with a concentration of active compound (in percent) of— | | |
|---|---|---|---|---|
| | | 0.025 | 0.0062 | 0.0031 |
| (A) | 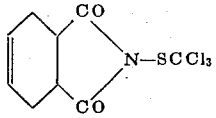 (known). | 7 | 15 | 20 |
| (III₂) | 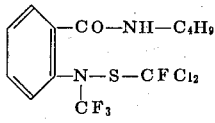 | 0 | 0 | 2 |
| (XXVI₂) | 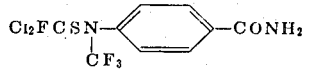 | 0 | 11 | 30 |
| (XII₃) | 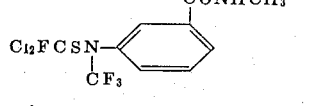 | 0 | 0 | 1 |
| (VII₄) | 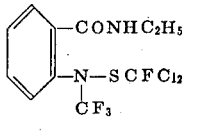 | ........ | 2 | 2 |
| (XXV₂) | 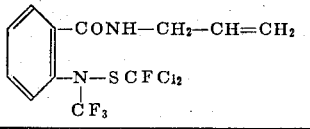 | ........ | 0 | 0 |

TABLE 6
Seed dressing test

| Active compound | | Concentration of active compound in the dressing in percent by weight | (Bunt of wheat) Amount of dressing used, g./kg. seed | Spore germination in percent |
|---|---|---|---|---|
| | Not dressed | | | >10 |
| (A) | [cyclohexene-dicarboximide N–SCCl$_3$] (Known) | 30 | 1 | 0.05 |
| (XXVI$_2$) | Cl$_2$FCSN(CF$_3$)–C$_6$H$_4$–CONH$_2$ | 1<br>3<br>10<br>30 | 1<br>1<br>1<br>1 | 0.05<br>0.000<br>0.000<br>0.000 |
| (XII$_4$) | Cl$_2$FCSN(CF$_3$)–C$_6$H$_4$–CONHCH$_3$ | 3<br>10<br>30 | 1<br>1<br>1 | 0.005<br>0.000<br>0.000 |
| (XXVII$_1$) | CF$_3$–C$_6$H$_3$(–CONH–CH$_2$–CH=CH$_2$)(–N(CF$_3$)–SCFCl$_2$) | 30 | 1 | 0.000 |
| (XXIV$_2$) | C$_6$H$_3$(Cl)(–N(CF$_3$)–SCFCl$_2$)(CON(CH$_3$)$_2$) | 30 | 1 | 0.000 |
| (XVI$_2$) | (CH$_3$)$_2$NCO–C$_6$H$_3$(CH$_3$)–N(CF$_3$)–SCFCl$_2$ | 30 | 1 | 0.000 |
| (XVIII$_2$) | C$_6$H$_3$(CH$_3$)(–N(CF$_3$)–SCFCl$_2$)(CON(CH$_3$)$_2$) | 30 | 1 | 0.000 |
| (XIX$_2$) | C$_6$H$_3$(OCH$_3$)(–N(CF$_3$)–SCFCl$_2$)(CONHCH$_3$) | 30 | 1 | 0.000 |
| | C$_6$H$_4$(OCH$_3$)(–N(CF$_3$)–SCFCl$_2$) | 30 | 1 | 0.000 |

EXAMPLE 7

Soil treatment agent test [soil-borne mycoses]

To produce a suitable preparation of the particular active compound, such active compound is extended with talc to a content of 5 percent and subsequently with quartz sand to a content of 0.5 percent of the active compound.

The preparation of the given active compound is uniformly mixed with Fruhstorfer standard soil, which has first been sterilized and then inoculated with pure cultures of the test fungi. The soil is filled into 5 pots, each of which is sown with 10 seeds of the host plant. The pots are placed in a greenhouse at the below stated temperatures and kept normally moist.

Three weeks after sowing, the number of healthy plants is determined as a percentage of the number of seeds sown. Zero percent means that no healthy plants have grown; 100 percent means that healthy plants have resulted from all the seeds.

The particular active compounds, the concentrations of such active compounds in the soil, the test fungi, host plant, greenhouse temperatures and the results obtained can be seen from the following Table 7:

TABLE 7

Soil treatment agent test [soil-borne mycoses]

| Active compounds | | Concentration of active compound in mg./litre soil | Number of healthy plants in percent | |
|---|---|---|---|---|
| | | | Rhizoct. solani [1] Peas [2] 18-22° C.[3] | Fusarium culmorum [1] Peas [2] 22-25° C.[3] |
| | Fruhstorfer standard soil sterilized untreated. | | 100 | 92 |
| | Fruhstorfer standard soil sterilized and inoculated untreated. | | 0 | 2 |
| (A) | [structure: phthalimide with N—SCCl₃] (known). | 100 | 24 | 0 |
| (IV₃) | [structure: benzene with —CONH₂ and —N(CF₃)—SCFCl₂] | 100 | 100 | |
| (V₃) | [structure: benzene with —CON(CH₃)₂ and —N(CF₃)—SCFCl₂] | 100 | 95 | |
| (VI₃) | [structure: benzene with —CONHCH₃ and —N(CF₃)—SCFCl₂] | 100 | 90 | |
| (XI₂) | [structure: benzene with —CON(CH₃)₂ and Cl₂FCSN(CF₃)—] | 100 | 100 | 78 |
| (XIV₂) | [structure: benzene with CF₃—, —CON(CH₃)₂ and —N(CF₃)—SCFCl₂] | 50 / 100 | 72 / 88 | |

[1] Test fungi.  [2] Host plant.  [3] Temperature range.

The following further examples are set forth by way of illustration and not limitation of the manner of preparing the particular active compounds of the present invention.

EXAMPLE 8

(III₃) 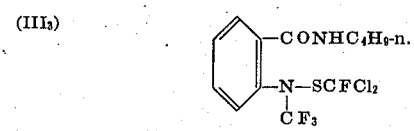

15g 2-fluorocarbonyl-N-dichlorofluoromethylthio-N-trifluoromethyl-aniline are dissolved in 100 ml toluene, and 8g n-butylamine in 20 ml toluene are added dropwise at room temperature. The temperature is allowed to rise to 50°C. The reaction solution is shaken out with water; this is followed by drying and concentration in a vacuum. The residue (17g) is recrystallized from white spirit to give 2-(N'-dichloromonofluoromethylthio-N'-trifluoromethylamino)-N-n-butyl-benzamide. m.p. 108–109°C.

EXAMPLE 9

In similar manner to Example 8 there are obtained:

(XXIX₁) 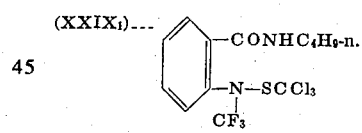   M.P.: 107–109° C.

2-(N'-trichloromethylthio-N'-trifluoromethylamino)-N-n-butyl-benzamide.

(VI₄) 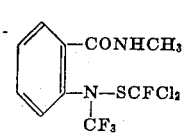   Oily.

2-(N'-dichloromonofluoromethylthio-N'-trifluoromethylamino)-N-methyl-benzamide.

(IV₄) 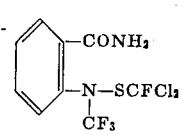   Oily.

2-(N-dichloromonofluoromethylthio-N-trifluoromethylamino)-benzamide.

(V₄) — [structure: benzene ring with —CON(CH₃)₂ and —N(CF₃)—SCFCl₂]  M.P.: 104–107° C.

2-(N'-dichloromonofluoromethylthio-N'-trifluoromethylamino)-N,N-dimethyl-benzamide.

(XXX₁) — [structure: benzene ring with —CONHC₆H₅ and —N(CF₃)—SCFCl₂]  M.P.: 145–147° C.

2-(N'-dichloromonofluoromethylthio-N'-trifluoromethylamino)-N-phenyl-benzamide.

(XXXI₁) — [structure: benzene ring with —CONHC₁₂H₂₅ and —N(CF₃)—SCFCl₂]  Oily.

2-(N'-dichloromonofluoromethylthio-N'-trifluoromethylamino)-N-dodecyl-benzamide.

EXAMPLE 10

(XXVI₄) [structure: Cl₂FCS—N(CF₃)—benzene—CONH₂]

34g 4-fluorocarbonyl-N-dichlorofluoromethylthio-N-trifluoromethyl-aniline are dissolved in 100 ml benzene, and 20 ml of 25 percent aqueous ammonia are added at room temperature, with vigorous stirring. The temperature is allowed to rise to 30°C, the two layers are separated and the benzene layer is concentrated. After recrystallization from white spirit, the reaction product of m.p. 89–91°C is obtained, i.e., 4-(N-dichloromonofluoromethylthio-N-trifluoromethyl-amino)-benzamide.

EXAMPLE 11

In similar manner to Example 10 there are obtained:

(VIII₂) — [structure: Cl₂FCS—N(CF₃)—benzene—CON(CH₃)₂]  Oily 4-(N'-dichloromonofluoromethylthio-N'-trifluoromethyl-amino)-N,N-dimethyl-benzamide.

(IX₂) — [structure: CF₃—N(SCFCl₂)—benzene—CONHC₄H₉-n]  Oily 3-(N'-dichloromonofluoromethylthio-N'-trifluoromethyl-amino)-N-n-butyl-benzamide.

(XXXII₁) — [structure: CF₃—N(SCFCl₂)—benzene—CONHC₆H₅]  M.P.: 115–118° C.

3-(N'-dichloromonofluoromethylthio-N'-trifluoromethyl-amino)-N-phenyl-benzamide.

(XI₃) — [structure: CF₃—N(SCFCl₂)—benzene—CON(CH₃)₂]  Oily 3-(N'-dichloromonofluoromethylthio-N'-trifluoromethyl-amino)-N,N-dimethyl-benzamide.

(XXI₅) — [structure: CF₃—N(SCFCl₂)—benzene—CONHCH₃]  M.P.: 60° C.

3-(N'-dichloromonofluoromethylthio-N'-trifluoromethyl-amino)-N-methyl-benzamide.

EXAMPLE 12

(XXXIII₁) [structure: Cl—benzene with —N(CF₃)—SCFCl₂ and —C(=O)—NHC₄H₉-n]

20g 2-fluorocarbonyl-5-chloro-N-dichlorofluoromethylthio-N-trifluoromethyl-aniline are dissolved in 100 ml benzene, and 8g n-butylamine in 20 ml benzene are added. The temperature rises to about 50°C. Filtering off cold with suction and concentration in a vacuum are effected. After recrystallization from white spirit, the reaction product melts at 72–76° C, i.e., 2-(N'-dichloromonofluoromethylthio-N'-trifluoromethyl-amino)-4-chloro-N-n-butyl-benzamide.

EXAMPLE 13

In corresponding manner to Example 12 there are obtained:

(XXXIV₁) — [structure: Cl—benzene with —N(CF₃)—SCCl₃ and —CONHC₄H₉-n]  M.P.: 90–93° C.

2-(N'-trichloromethylthio-N'-trifluoromethyl-amino)-4-chloro-N-n-butyl-benzamide.

(XXXV₁) — [structure: Cl—benzene with —N(CF₃)—SCCl₃ and —CON(CH₃)₂]  M.P.: 144–45° C.

2-(N'-trichloromethylthio-N'-trifluoromethyl-amino)-4-chloro-N,N-dimethyl-benzamide.

(XXXVI₁) — [structure: Cl—benzene with —N(CF₃)—SCFCl₂ and —CON(CH₃)₂]  M.P.: 95° C.

2-(N'-dichloromonofluoromethylthio-N'-trifluoromethyl-amino)-4-chloro-N,N-dimethyl-benzamide.

EXAMPLE 14

(XIII₂) [structure: CF₃—benzene with —N(CF₃)—SCFCl₂ and —CONHC₄H₉-n]

18g 2-fluorocarbonyl-4-trifluoromethyl-N-dichlorofluoromethylthio-N-trifluoromethyl-aniline are dissolved in 100 ml benzene, and a solution of 6.5g n-butylamine in 200 ml benzene is added. After completion of the reaction, shaking out with water is effected. From the benzene solution, after concentration, the reaction product is obtained as crystalline residue (21g) of m.p. 103°C, i.e., 2-(N'-dichloromonofluoromethylthio-N'-trifluoromethyl-amino)-5-trifluoromethyl-N-n-butyl-benzamide.

EXAMPLE 15

According to the same method as Example 14 there are obtained:

(XIV₃) 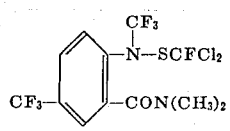 Oily.

2-(N'-dichloromonofluoromethylthio-N'-trifluoromethylamino)-5-trifluoromethyl-N,N-dimethyl-benzamide.

(XXVII₂) 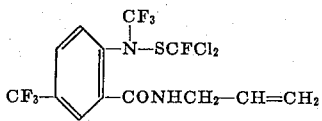 Oily.

2-(N'-dichloromonofluoromethylthio-N'-trifluoromethylamino)-5-trifluoromethyl-N-α-allyl-benzamide.

EXAMPLE 16

Using corresponding molar amounts of each of the following fluorocarbonyl-N-trihalomethylthio-N-trifluoromethylanilines with each of the following amines, respectively, in accordance with the procedure of Example 8, as the case may be:

a. 2-fluorocarbonyl-3,4,5-trichloro-N-bromochlorofluoromethylthio-N-trifluoromethyl-aniline and prop-2-enylamine;
b. 5-fluorocarbonyl-3-fluoro-2-bromo-N-trifluoromethylthio-N-trifluoromethyl-aniline and N-methyl-N-n-dodecyl-amine;
c. 4-fluorocarbonyl-3-tert.-butyl-2-iodo-N-difluoromonochloromethylthio-N-trifluoromethyl-aniline and N-methallyl-N-(3'-chloro-4'-nitro-5'-fluoro-phenyl)-amine; and
d. 6-fluorocarbonyl-4-ethoxy-3-isopropyl-2-trifluoromethyl-N-chloroiodofluoromethylthio-N-trifluoromethyl-aniline and N-isopropyl-N-(3'-isopropyl-4'-bromo-5'-ethoxy-phenyl)-amine;
the corresponding final compounds are produced:
a'. 6-(N'-bromochlorofluoromethylthio-N'-trifluoromethylamino)-2,3,4-trichloro-N-prop-2-enyl-benzamide;
b'. 3-(N'-trifluoromethylthio-N'-trifluoromethylamino)-4-bromo-5-fluoro-N-vinyl-N-n-dodecyl-benzamide;
c'. 4-(N'-difluoromonochloromethylthio-N'-trifluoromethylamino)-33-iodo-2-tert.-butyl-N-methallyl-N-(3'-chloro-4'-nitro-5'-fluoro-phenyl)-benzamide; and
d'. 6-(N'-chloroiodofluoromethylthio-N'-trifluoromethylamino)-5-trifluoromethyl-4-isopropyl-3-ethoxy-N-isopropyl-N-(3'-isopropyl-4'-bromo-5'-ethoxy-phenyl)-benzamide.

EXAMPLE 3A

The procedure of Example 3 is repeated and the following results are obtained:

TABLE 3A
Podosphaera test (Protective)

| Active compound | Infestation as a percentage of the infestation of the untreated control with a concentration of active compound (in percent) of— | |
|---|---|---|
| | 0.025 | 0.0062 |
| (A) [structure with N—SCCl₃] known | 100 | |
| (XXXVII₁) [structure with CF₃—N—S—CFCl₂, Cl, CO—NH—phenyl] | 58 | |
| (XXXVIII₁) [structure phenyl—NH—CO—phenyl with CH₃, N—S—CFCl₂, CF₃] | 89 | |
| (XXXIX₁) [structure CF₃—N—S—CFCl₂, phenyl—CO—NH—phenyl—CH₃] | 59 | |
| (XL₁) [structure phenyl—N(CH₃)—CO—phenyl—OCH₃ with CF₃—N—S—CFCl₂] | 60 | |

TABLE 3A—Continued
Podosphaera test (Protective)

| Active compound | Infestation as a percentage of the infestation of the untreated control with a concentration of active compound (in percent) of— | |
|---|---|---|
| | 0.025 | 0.0062 |
| (XLI$_1$) CH$_3$—⟨phenyl⟩—NH—CO—⟨phenyl with CF$_3$—N—S—CFCl$_2$ and CH$_3$⟩ | 54 | |
| (XLII$_1$) H$_2$N—C(O)—⟨phenyl⟩—N(CF$_3$)—SCFCl$_2$ | 4 | 45 |
| (XLIII$_1$) Cl—⟨phenyl with —CO—NH—C$_2$H$_5$⟩—N(CF$_3$)—S—CFCl$_2$ | 23 | 66 |
| (XLIV$_1$) Cl—⟨phenyl with —CONHC$_3$H$_7$-i⟩—N(CF$_3$)—SCFCl$_2$ | 71 | |
| (XLV$_1$) i-C$_3$H$_7$NH—C(O)—⟨phenyl⟩—N(CF$_3$)—SCFCl$_2$ | 61 | |
| (XLVI$_1$) ⟨phenyl with —CONHC$_3$H$_7$-i⟩—N(CF$_3$)—SCFCl$_2$ | 64 | |

EXAMPLE 4A

The procedure of Example 4 is repeated and the following results are obtained:

TABLE 4A
Fusicladium test [Curative]

| Active compound | Residence period in hours | Infestation as a percentage of the infestation of the untreated control with a concentration of active compound (in percent) of | |
|---|---|---|---|
| | | 0.1 | 0.025 |
| (A) ⟨cyclohexene-1,2-dicarboximide⟩N—SCCl$_3$ | 42 | 100 | |
| (XXXVII$_2$) CF$_3$—N—S—CFCl$_2$ on ⟨phenyl with —CO—NH—phenyl and Cl⟩ | 42 | 80 | |
| (XLVII$_1$) Cl—⟨phenyl with —CO—NH—phenyl⟩—N(CF$_3$)—S—CFCl$_2$ | 42 | 73 | |
| (XLVIII$_1$) ⟨phenyl⟩—NHCO—⟨phenyl with Cl⟩—N(CF$_3$)—S—CFCl$_2$ | 42 | 72 | 1 |

TABLE 4A—Continued
Fusicladium test [Curative]

| Active compound | | Residence period in hours | Infestation as a percentage of the infestation of the untreated control with a concentration of active compound (in percent) of | |
|---|---|---|---|---|
| | | | 0.1 | 0.025 |
| (XXXIX₂) | CF₃—N—S—CFCl₂ on phenyl—CO—NH—phenyl—CH₃ 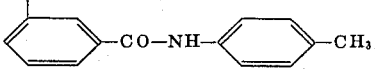 | 42 | 86 | |
| (XL₂) | phenyl—N(CH₃)—CO—phenyl(OCH₃)—N(CF₃)—S—CFCl₂ 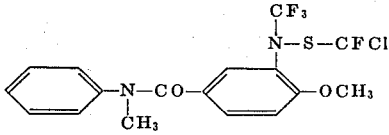 | 42 | 86 | |
| (XXII₂) | CH₃NH—CO—phenyl(Cl)—N(CF₃)—SCFCl₂ 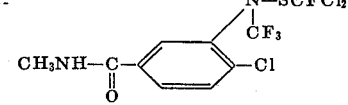 | 42 | 70 | 79 |
| (XLII₂) | H₂N—CO—phenyl—N(CF₃)—SCFCl₂ 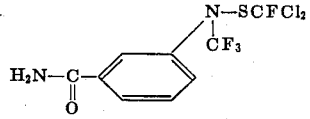 | 42 | 12 | 23 |
| (XLIII₂) | Cl—phenyl(CO—NH—C₂H₅)—N(CF₃)—S—CFCl₂ 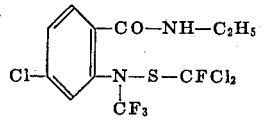 | 42 | 74 | |
| (XLV₂) | i-C₃H₇NH—CO—phenyl—N(CF₃)—SCFCl₂ 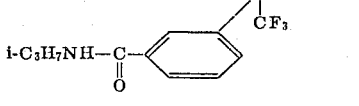 | 42 | 88 | |
| (XLVI₂) | phenyl(CONHC₃H₇-i)—N(CF₃)—SCFCl₂ 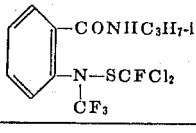 | 42 | 68 | |

EXAMPLE 5A

The procedure of Example 5 is repeated and the following results are obtained:

TABLE 5A
Fusicladium test [Protective]

| Active compound | | Infestation as a percentage of the infestation of the untreated control with a concentration of active compound (in percent) of— | | |
|---|---|---|---|---|
| | | 0.025 | 0.0062 | 0.0031 |
| (A) | cyclohexene dicarboximide N—SCCl₃ (known) 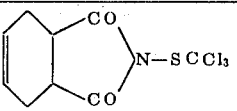 | 7 | 15 | 20 |
| (XXII₃) | CH₃NH—CO—phenyl(Cl)—N(CF₃)—SCFCl₂ 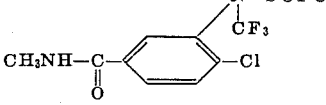 | 0 | 0 | |

TABLE 5A—Continued

Fusicladium test [Protective]

| Active compound | Infestation as a percentage of the infestation of the untreated control with a concentration of active compound (in percent) of— | | |
|---|---|---|---|
| | 0.025 | 0.0062 | 0.0031 |
| (XLII$_3$) [structure: phenyl with N—SCFCl$_2$/CF$_3$ and H$_2$N—CO—] | 0 | 0 | 0 |
| (XLIII$_3$) [Cl-phenyl with —CO—NH—C$_2$H$_5$ and N—S—CFCl$_2$/CF$_3$] | 0 | 0 | |
| (XLIV$_2$) [Cl-phenyl with —CONHC$_3$H$_7$-i and N—SCFCl$_2$/CF$_3$] | 0 | 0 | |
| (XLV$_3$) [phenyl with N—SCFCl$_2$/CF$_3$ and i-C$_3$H$_7$NH—CO—] | 0 | 0 | |
| (XLVI$_3$) [phenyl with —CONHC$_3$H$_7$-i and N—SCFCl$_2$/CF$_3$] | 0 | 0 | 2 |

Physical property data for compounds XXXVII to XLVIII

TABLE 6 A

| Active compound No. | Melting point (°C) |
|---|---|
| (XXXVII) | (oily) |
| (XXXVIII) | 148–150 |
| (XXXIX) | 135–138 |
| (XL) | 108 |
| (XLI) | 129 |
| (XLII) | 142–145 |
| (XLIII) | 129–130 |
| (XLIV) | 145–147 |
| (XLV) | 132–133 |
| (XLVI) | 152–154 |
| (XLVII) | 156–159 |
| (XLVIII) | (oily) |

Advantageously, in accordance with the present invention, in the foregoing formulas:

$R_1$ represents trihalomethyl such as tri- chloro and fluoro-methyl; tri- mixed chloro, bromo, fluoro and iodo -methyl including dichloro-mono- bromo, fluoro and iodo -methyl, difluoro-mono- chloro, bromo and iodo -methyl, dibromo-mono- chloro, fluoro and iodo -methyl, etc.; chloro-bromo-fluoro-methyl; chloro-iodo-fluoro-methyl; and the like, especially trichloromethyl, dichloromonofluoromethyl and difluoromonochloromethyl;

$R_2$ represents halo such as chloro, bromo, iodo and fluoro, especially chloro, bromo and fluoro;

lower alkyl such as methyl, ethyl, n-propyl, isopropyl, n-butyl, isobutyl, sec.-butyl, tert.-butyl, and the like, especially alkyl having one to four or one to three or one to two carbon atoms;

lower alkoxy such as methoxy, ethoxy, n-propoxy, isopropoxy, n-butoxy, isobutoxy, sec.-butoxy, tert.-butoxy, and the like, especially alkoxy having one to four or one to three or one to two carbon atoms; and/or trifluoromethyl;

$R_3$ represents hydrogen;

lower alkyl such as methyl to tert.-butyl inclusive as defined above for $R_2$, especially alkyl having one to four or one to three or one to two carbon atoms; or lower alkenyl such as α-allyl (prop-2-enyl), β-allyl (isopropenyl or 1-methyl-vinyl), γ-allyl (prop-1-enyl), but-1-enyl, but-2-enyl (crotyl) but-3-enyl, isobutenyl (2-methyl-prop-1-enyl), methallyl (2-methyl-prop-2-enyl), and the like, especially alkenyl having two to four or two to three or three to four carbon atoms;

$R_4$ represents hydrogen;

alkyl such as methyl, ethyl, n-propyl, isopropyl, n-butyl, isobutyl, sec.-butyl, tert.-butyl, n-amyl, isoamyl, n-hexyl, isohexyl, n-heptyl, n-octyl, isooctyl, n-nonyl, n-decyl, n-undecyl, n-dodecyl, etc., and the like, especially alkyl having one to twelve carbon atoms, more especially lower alkyl, and particularly alkyl having one to four or one to three or one to two carbon atoms;

alkenyl such as allyl to methallyl inclusive as defined for $R_3$ above, and the like, especially lower alkenyl, and particularly alkenyl having two to four or two to three or three to four carbon atoms;

cycloalkyl such as cyclo-pentyl, -hexyl, -heptyl, -octyl, and the like, especially cycloalkyl having five to six ring carbon atoms and particularly cyclopentyl and cyclohexyl;

phenyl;

substituted phenyl which is mono, di, poly and mixed substituted with 1-3 of halo as defined for $R_2$ and especially chloro, bromo and/or fluoro; nitro; lower alkyl such as methyl to tert.-butyl inclusive as defined for $R_2$, especially alkyl having one to four carbon atoms and particularly alkyl having one to three or one to two carbon atoms; and/or lower alkoxy such as methoxy to tert.-butoxy inclusive as defined for $R_2$, especially alkoxy having one to four carbon atoms and particularly alkoxy having one to three or one to two carbon atoms; or hydroxy-lower alkyl such as hydroxy substituted methyl to tert.-butyl inclusive as defined above, and the like, especially hydroxy-$C_{1-4}$ or $C_{1-3}$ or $C_{1-2}$ alkyl, and more especially $\beta$-hydroxy-ethyl; and $n$ is a whole number from 0-3, and especially 0 or 1, such that when $n$ is 2 or 3 then the corresponding two or three $R_2$ radicals may be the same or different.

All of the particular new active compounds of formula (I) above may be prepared in the manner described herein, and especially in accordance with the appropriate specific procedure of production Examples 8, 12 and 14.

It will be realized by the artisan that all of the foregoing compounds contemplated by the present invention possess the desired strong fungicidal properties, with regard to a broad spectrum of activity, as well as a comparatively low toxicity toward warm-blooded creatures and a concomitantly low phytotoxicity, enabling such compounds to be used with correspondingly favorable compatibility with respect to warm-blooded creatures and plants for more effective control and/or elimination of fungi by application of such compounds to such fungi and/or their habitat.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. A fungicidal composition comprising a mixture of a solid or liquid dispersible carrier vehicle and a compound of the formula

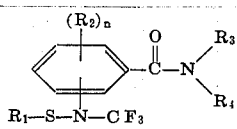

in which $n$ is a whole number from 0 to 1, $R_1$ is selected from the group consisting of trichloromethyl, trifluoromethyl, dichloromonofluoromethyl, difluoromonochloromethyl and bromochlorofluoromethyl, $R_2$ is selected from the group consisting of halo, lower alkyl having one to four carbon atoms, lower alkoxy having one to four carbon atoms and trifluoromethyl, $R_3$ is selected from the group consisting of hydrogen, lower alkyl having one to four carbon atoms and lower alkenyl having two to four carbon atoms, and $R_4$ is selected from the group consisting of hydrogen, alkyl having one to 12 carbon atoms, lower alkenyl having two to four carbon atoms, cycloalkyl having five to six ring carbon atoms, hydroxyloweralkyl having one to four carbon atoms, phenyl and substituted phenyl which is substituted with 1-3 substituents individually selected from the group consisting of halo, nitro, lower alkyl having one to four carbon atoms and lower alkoxy having one to four carbon atoms, said compound being present in a fungicidally effective amount and constituting substantially between about 0.0005-95 percent by weight of the mixture.

2. A method of combatting fungi, which comprises applying to at least one of (a) such fungi and (b) their habitat, a fungicidally effective amount of a compound of the formula

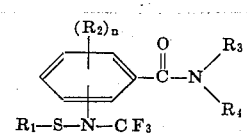

in which $n$ is a whole number from 0 to 1, $R_1$ is selected from the group consisting of trichloromethyl, trifluoromethyl, dichloromonofluoromethyl, difluoromonochloromethyl and bromochlorofluoromethyl, $R_2$ is selected from the group consisting of halo, lower alkyl having one to four carbon atoms, lower alkoxy having one to four carbon atoms and trifluoromethyl, $R_3$ is selected from the group consisting of hydrogen, lower alkyl having one to four carbon atoms and lower alkenyl having two to four carbon atoms, and $R_4$ is selected from the group consisting of hydrogen, alkyl having one to 12 carbon atoms, lower alkenyl having two to four carbon atoms, cycloalkyl having five to six ring carbon atoms, hydroxyloweralkyl having one to four carbon atoms, phenyl and substituted phenyl which is substituted with 1-3 substituents individually selected from the group consisting of halo, nitro, lower alkyl having one to four carbon atoms and lower alkoxy having one to four carbon atoms.

3. The method of claim 2 wherein the compound is used in the form of a mixture with a solid or liquid dispersible carrier vehicle, said compound being present in a fungicidally effective amount of about 0.0005-0.5 percent by weight of the mixture.

4. The method of claim 2 wherein $n$ is a whole number from 0 to 1, $R_1$ is selected from the group consisting of trichloromethyl, trifluoromethyl, dichloromonofluoromethyl, difluoromonochloromethyl and bromochlorofluoromethyl, $R_2$ is selected from the group consisting of halo, lower alkyl having one to four carbon atoms, lower alkoxy having one to four carbon atoms and trifluoromethyl, $R_3$ is selected from the group consisting of hydrogen, lower alkyl having one to four carbon atoms and lower alkenyl having two to four carbon atoms, and $R_4$ is selected from the group consisting of hydrogen, lower alkyl having one to four carbon atoms, lower alkenyl having two to four carbon atoms, cycloalkyl having five to six ring carbon atoms, hydroxyloweralkyl having one to four carbon atoms, phenyl and lower alkyl-phenyl having one to four carbon atoms in the lower alkyl moiety.

5. The method of claim 2 wherein $n$ is a whole number from 0 to 1, $R_1$ is selected from the group consisting of dichloromonofluoromethyl, trichloromethyl and bromochlorofluoromethyl, $R_2$ is selected from the group consisting of halo, lower alkyl having one to three carbon atoms, lower alkoxy having one to two carbon atoms and trifluoromethyl, $R_3$ is selected from the group consisting of hydrogen, lower alkyl having one to four carbon atoms and lower alkenyl having two to four carbon atoms, and $R_4$ is selected from the group consisting of hydrogen, lower alkyl having one to four carbon atoms, lower alkenyl having two to four carbon atoms, cyclohexyl, phenyl and para-lower alkylphenyl having one to three carbon atoms in the lower alkyl moiety.

6. The method of claim 2 wherein the compound is 2-(N-dichloromonofluoromethylthio-N'-trifluoromethyl-amino)-N-n-butyl-benzamide.

7. The method of claim 2 wherein the compound is 2-(N-dichloromonofluoromethylthio-N-trifluoromethyl-amino)-benzamide.

8. The method of claim 2 wherein the compound is 2-(N'-dichloromonofluoromethylthio-N'-trifluoromethyl-amino)-N,N-dimethyl-benzamide.

9. The method of claim 2 wherein the compound is 4-(N'-dichloromonofluoromethylthio-N'-trifluoromethyl-amino)-3-methyl-N,N-dimethyl-benzamide.

10. The method of claim 2 wherein the compound is 3-(N'-dichloromonofluoromethylthio-N'-trifluoromethyl-amino)-4-methoxy-N-methyl-benzamide.

11. The method of claim 2 wherein the compound is 3-(N'-dichloromonofluoromethylthio-N'-trifluoromethyl-amino)-4-chloro-N-methyl-benzamide.

12. The method of claim 2 wherein the compound is 2-(N'-dichloromonofluoromethylthio-N'-trifluoromethyl-amino)-5-trifluoromethyl-N-α-allyl-benzamide.

13. The method of claim 2 wherein the compound is 3-(N'-dichloromonofluoromethylthio-N'-trifluoromethyl-amino)-benzamide.

14. The method of claim 2 wherein the compound is 2-(N'-dichloromonofluoromethylthio-N'-trifluoromethyl-amino)-4-chloro-N-ethyl-benzamide.

15. The method of claim 2 wherein the compound is 2-(N'-dichloromonofluoromethylthio-N'-trifluoromethyl-amino)-4-chloro-N-isopropyl-benzamide.

16. The method of claim 2 wherein the compound is 3-(N'-dichloromonofluoromethylthio-N'-trifluoromethyl-amino)-N-isopropyl-benzamide.

17. The method of claim 2 wherein the compound is 2-(N'-dichloromonofluoromethylthio-N'-trifluoromethyl-amino)-N-isopropyl-benzamide.

* * * * *

UNITED STATES PATENT OFFICE
CERTIFICATE OF CORRECTION

Patent No. 3,723,628              Dated  March 27, 1973

Inventor(s) Hans Scheinpflug et al

It is certified that error appears in the above-identified patent and that said Letters Patent are hereby corrected as shown below:

Col. 4, line 63
   "liquid p preparation" omit "p".

Col. 3, line 64
   "liquid p reparation" should be -- liquid preparation --.

Col. 12, Table 2a
   for compound ($VII_2$), under "Mycosphaerella...", the No. "30" should be -- 10 --.

Col. 15, Table 5
   In the heading, "Active Compound" is missing. Also, (Spec. p. 24, l. 14), for comp. $XXVI_2$, the parenthesis on the right is backward Col. 24, line 24
   "-33- iodo-" should be -- -3-iodo- --.

Signed and sealed this 27th day of November 1973.

(SEAL)
Attest:

EDWARD M. FLETCHER, JR.            RENE D. TEGTMEYER
Attesting Officer                  Acting Commissioner of Patents